Oct. 6, 1964   H. T. RAITT   3,151,536
PALLET FOR THE REAR OF A SELF-DEVELOPING TYPE CAMERA
Filed May 31, 1962   2 Sheets-Sheet 1
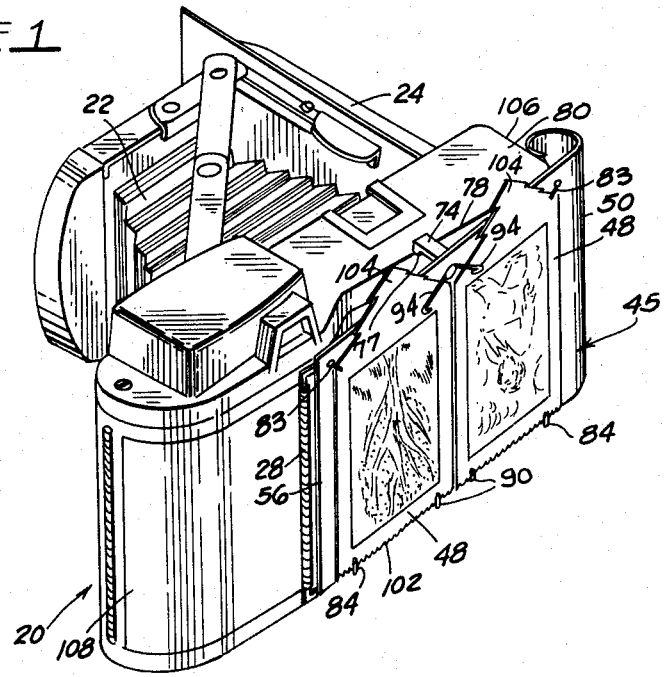
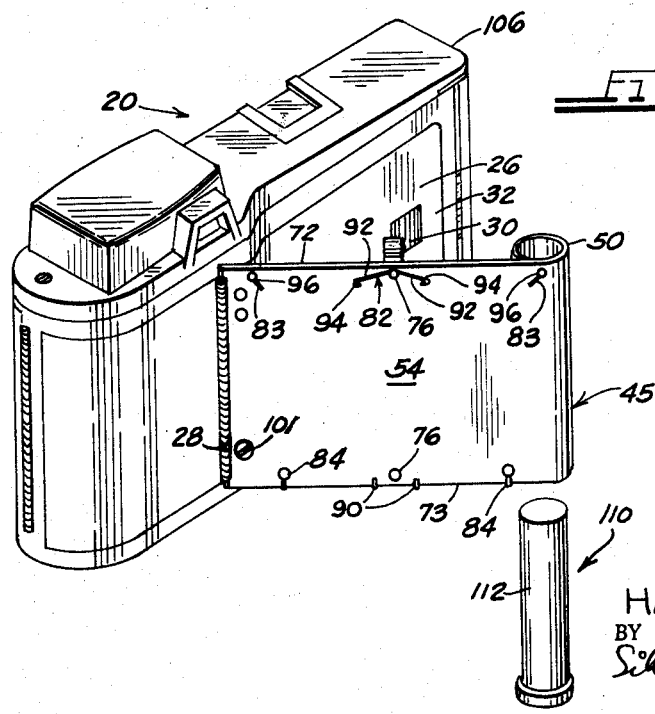
INVENTOR.
HAROLD T. RAITT Oct. 6, 1964  H. T. RAITT  3,151,536
PALLET FOR THE REAR OF A SELF-DEVELOPING TYPE CAMERA
Filed May 31, 1962  2 Sheets-Sheet 2
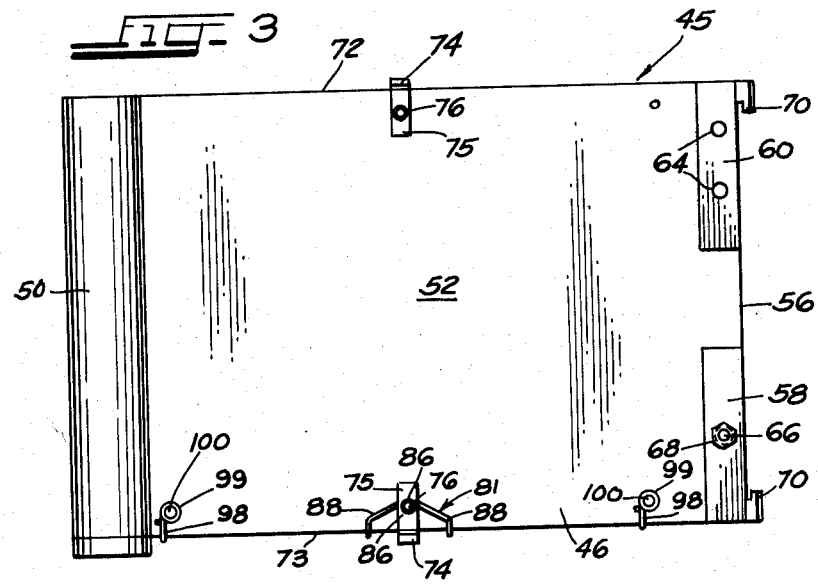
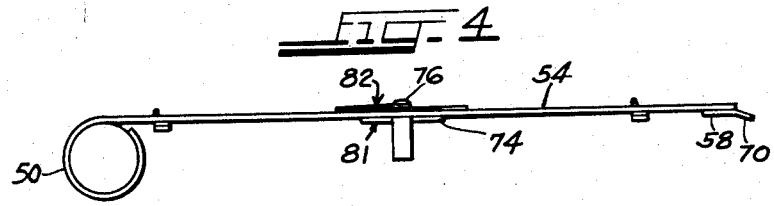
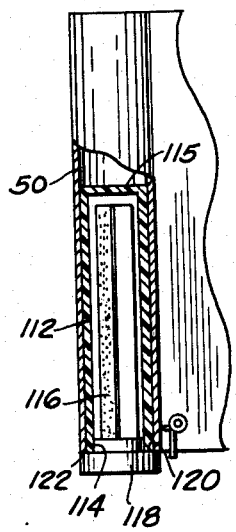
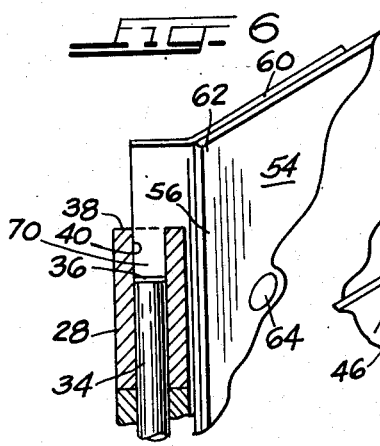
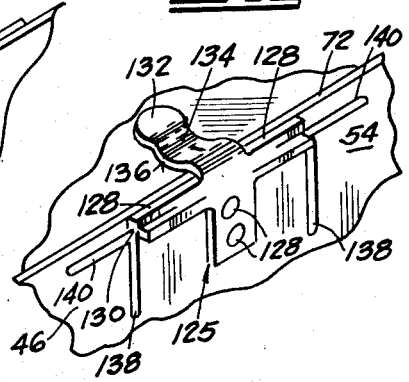
INVENTOR.
HAROLD T. RAITT

United States Patent Office

3,151,536
Patented Oct. 6, 1964

3,151,536
PALLET FOR THE REAR OF A SELF-DEVELOPING TYPE CAMERA
Harold T. Raitt, Fort Wayne, Ind.
(3140 Kirkcaldy Road, Memphis, Tenn.)
Filed May 31, 1962, Ser. No. 199,012
10 Claims. (Cl. 95—13)

This invention relates generally to the art of photography and more particularly, relates to a novel pallet device for photographic film adapted to be mounted on the same hinge as the rear door of a self-developing camera.

The invention is especially useful in connection with the well known "Polaroid" type camera which is self-processing, that is, which develops and processes a finished print in the camera after exposure of the photographic film. Such a camera is loaded with photographic film which comprises a sheet coated with a photo-sensitive, silver-halide or the like emulsion in contact with a second sheet superimposed thereon. A processing fluid is disposed between the two sheets. After exposing the photo-sensitive emulsion, the superimposed and developed sheets are pulled out of the camera through a rear door to take care of the exposed portions. This part of the superimposed sheets then is torn off and the sheets separated to provide a sheet bearing a positive image, i.e., a positive reflection print is obtained. Since the surface of the print is soft so that it cannot readily be handled without damage, it is the practice to finish the print by applying a protective plastic coating thereover by means of an applicator or brush having an absorbent surface impregnated with a suitable liquid coating composition commercially available for this purpose.

In order to apply the protective plastic coating to the print, a firm, flat surface is required as a support. After the coating composition is applied, the finished print must remain exposed to the atmosphere for drying. Prior to applying the coating composition, a problem arises as a result of the rolled form in which the photographic film is applied and carried in the camera which causes the positive reflection print to set in a curved contour or coiled upon itself. It is advisable that the print be flat especially at the time the coating composition is to be applied and thereafter for handling at the print. In order to obtain the desired, flat contour, it has been usual to work the rear surface of the curved print over a straight or curved edge such as by pressing same against furniture, walls or the like. After the positive print has been coated, the print is laid on an available surface for drying of the coating composition. After drying, it is not uncommon for the print to have curled or coiled substantially so that a flat print is not easily obtained.

Where the self-processing film is used outdoors in locations which are open and exposed to wind, or at which furniture or other articles are not available, such as in a field or forest or boat, the problems encountered in handling of the positive print after it is removed from the camera are very thorny. The photographer often is relegated to holding the coated printed until it has dried, which means that no pictures can be taken until the finished print can be stored safely so as to free the hands of the photographer to take more pictures. During this interval, he may lose the opportunity to photograph desirable scenes or activities, perhaps forever. Many other disadvantages and inconveniences are encountered in following the procedure dictated by the manner of use of such self-processing cameras.

Heretofore, attempts have been made to provide some manner of attachment for a camera of the "Polaroid" type for holding the positive reflective prints but these have been less than satisfactory. Some attachments have required their being installed in a position which interfered with efficient and convenient use of the camera. Other structures previously employed for this general purpose caused staining and/or tearing of the positive reflection print because of the means employed to hold the print in place. The prior structures available were limited in size and did not successfully hold the print flat during the drying interval while still permitting the camera to be used easily and efficiently. An important disadvantage of prior structures also resided in the means employed for attaching same on the camera which included either cumbersome fastening means, modification of the camera in some manner to accommodate the attachment, and failure to provide convenient access to parts of the camera required for successful use of the camera. In addition, prior art attachments have been relatively expensive to manufacture so as to discourage their more universal acceptance by the public.

Accordingly, it is a major object of the invention to provide a pallet device for self-processing cameras characterized by a construction which will successfully eliminate the foregoing as well as other disadvantages attendant prior devices of this general type.

A primary object of the invention is to provide a pallet device of the character described comprising a plate or panel adapted to be mounted on the same hinge as the rear door of a Polaroid-type camera, said plate having resilient clip means for releasably securing the device on the rear door of the camera during use of the camera and permitting the device to be pivoted to a position clear of the door so as to give access thereto, and holding means on the upper surface of the plate for attaching newly developed positive prints supported flat thereon.

Another important object of the invention is to provide a pallet device of the character described having pintle means along one side thereof for hingedly mounting the device on the camera using the already available hinge for the rear door of the camera, the opposite side edge of the plate having a curled flange to provide an additional hand grip for use of the camera.

Another object of the invention is to provide a pallet of the character described in which said curled flange is formed also to be available for use as a housing for a coating cartridge for applying a protective plastic composition over the print after it is removed from the camera.

Another object of the invention is to provide a pallet of the character described which enables the newly developed print to supported flat thereon after having been protectively coated with a plastic composition for drying without interfering with operation of the camera during the drying interval.

Another object of the invention is to provide a pallet attachment of the character described which can be installed on a Polaroid camera without requiring additional modification of the camera and which can hold the print thereon safely and securely during subsequent use of the camera.

Other objects of the invention are to provide a pallet for attachment on a "Polaroid" camera which is economical to manufacture and install; which is strong and durable; which is easy and convenient to use; which permits the newly developed print to be attached thereon rapidly with one hand while the camera is held with the other; which has novel clip means adjacent top and bottom ends of the pallet for holding the print securely on the pallet without staining, marring or tearing edges of the print.

The foregoing and other objects of the invention will become apparent as the description thereof evolves. A preferred embodiment of the invention is described in detail in the specification and illustrated in the accompanying drawings. It is contemplated that minor variations in the size, arrangement, construction and proportion of the several parts thereof may occur to the skilled artisan without departing from the scope or sacrificing any of the advantages thereof.

In the drawings wherein the same reference characters are employed to designate identical or similar parts throughout the several figures thereof:

FIG. 1 is a rear perspective view of a "Polaroid" type camera having the pallet device embodying the invention attached on the rear door of the camera and showing prints secured on the device.

FIG. 2 is a rear perspective view of the camera of FIG. 1 with said pallet device pivoted away from the rear door of the camera and showing how a coating cartridge is accommodated in the end of the pallet.

FIG. 3 is a bottom plan view of the pallet device embodying the invention.

FIG. 4 is an edge-on elevational view of said pallet device.

FIG. 5 is a fragmentary top elevational view of one end of the pallet having the curled flange, portions of the flange being broken away to show details, including the housing provided thereby for a protective coating cartridge.

FIG. 6 is a fragmentary enlarged sectional view taken axially through the rear door hinge of the "Polaroid" type camera and showing a portion of the pallet device mounted on said rear door hinge.

FIG. 7 is a fragmentary perspective view of said pallet showing a modified form of spring-clip means for releasably securing the pallet on the rear door of said camera.

Referring now to the drawings, the reference character 20 designates generally a structure which is representative generally of a camera of the "Polaroid" type. In FIG. 1, the camera 20 is shown in open position where bellows 22 is extended supported on a front cover member 24. In FIG. 2, the camera is shown with the bellows 22 collapsed and stored in the interior of the camera. The camera has a rear door 26 pivotally mounted along a lateral edge thereof on the hinge 28 and a latch 30 (FIG. 2) is provided adjacent the opposite lateral edge 32 of the rear door for releasably locking the door in closed position over an access opening in the film holding chamber of the camera (not shown). The rear door 26 must be opened for loading the photographic film in the camera and in some models of cameras, for removing portions of the film which have been exposed in order to obtain the desired print as previously described. The hinge 28 is a conventional so-called piano hinge and as seen in somewhat greater detail in FIG. 6 comprises complementary cylindrical hinge sections on the door and camera held together by a hinge pin 34. As seen in FIG. 6, the end 36 of pin 34 stops short of the end 38 of hinge 28 so as to provide a short, hollow bearing portion 40. Although not shown, the hinge 28 will have a similar bearing portion 40 at the end thereof opposite end 38. This may be provided on the conventional "Polaroid" camera, but, if not so provided, the pin 34 is easily removed for shortening the same relative to the length of hinge 28 and replacing the pin so as to obtain bearing portions 40 at opposite ends of the hinge 28.

The pallet device embodying the invention is designated generally by the reference character 45 in FIGS. 1, 2 and 3. Said device 45 comprises a sheet or plate 46 of substantially rectangular configuration and formed of a suitably rigid metal, plastic or the like. For purposes of lightweight construction and ease of fabrication, sheet aluminum is preferred. The plate 46 is provided with a planar body portion of suitable area to hold at least one positive print 48 thereon, although, a pair of such prints 48 may be accommodated side-by-side on the plate 46, as seen in FIG. 1. One end of said plate is curled to provide a hollow, substantially cylindrical formation 50 open at opposite extremities thereof and coextensive with the end of the plate with which it is integrally formed. The cylindrical formation 50 is curved in a direction toward surface 52 of the plate which, for purposes of description, will be considered the rear or bottom surface. As a result, the upper or top surface 54 of the plate 46 is entirely flat.

Secured to the bottom surface 52 adjacent the opposite end 56 of the plate 46 are the pintle means for mounting the device 45 on the same hinge 28 as the rear door 26 of the camera. Said mounting means comprise a pair of substantially similar flat strips 58 and 60 of metal or other suitable material of substantially rectangular configuration, although the shape thereof may vary. Each strip 58 and 60 is mounted flush with a corner 62 of the plate at said end 56 (see FIG. 6). The strip 60 is fixedly secured to the plate 46 by rivets 64 whereas, the strip 58 preferably is mounted by means of bolt 66 passed through suitable aligned openings in the plate and strip and tightened to hold the strip 58 immovable by means of the nut 68. As seen in FIG. 3, the strips are substantially flush with the marginal edge of end 56. Integrally formed on each of said strips at a location thereon adjacent the corner 62 is a pintle 70, the pintle angling slightly to be offset below the bottom surface 52 and extend outwardly of the end 56. The pintles 70 face inwardly one toward the other, as seen in FIG. 3 and are of suitable transverse dimension to be accommodated in the bearing formation 40. The distance between said pintles 70 is less than the axial length of hinge 28. The strip 58 is pivotable about the bolt 66 sufficiently to enable said pintles to be spread apart and inserted into the bearing formations 40 at opposite ends of the hinge 28. Thereafter, nut 68 can be tightened to prevent inadvertent movement of the strip 58 relative to the plate 46 in the installed position of the device 45.

Adjacent the top edge 72 and bottom edge 73 respectively of the plate 46 is a spring finger 74 each of which depends from the bottom surface 52 approximately centered along said edges 72 and 73 respectively. Each spring finger 74 may be formed from a suitable, resilient sheet metal or plastic and secured to the surface 52 by means of an integral flange 75 substantially perpendicular to the finger 74 and rivet 76. As seen in FIG. 1, the finger 74 has a projection 77 on its inner surface suitable for engaging behind a corresponding ridge or shoulder 78 which may be provided on the upper end 80 and bottom end (not shown) of some models of camera 20. However, the normal bias of the finger 74 against the end of the camera engaged thereby is sufficient to maintain the two frictionally engaged for use of the camera even where no such ridge or shoulder is provided. Also, in some models of cameras, only one such finger 74 may be needed to hold the device 45 in place.

Likewise, along each of the edges 72 and 73 are spring metal clips 81, 82, 83 and 84. Said clips preferably are made from thin gauge wire. The clip 81 has loop 86 intermediate the ends thereof by means of which the clip 81 is secured to the device. The rivet 76 is passed through the loop 86 to secure the clip on the flange 75 of one of the spring fingers 74. Extending from the loop 86 on opposite sides thereof are arms 88 which are bent adjacent respective ends thereof and passed around the bottom edge 73 and over upon the upper surface 54. Thus, as seen in FIG. 2, extending around bottom 73 and engaged upon surface 54 are the ends 90 of the wire clip 82 said ends 90 being normal to edge 73 and disposed on opposite sides of rivet 75. The ends 90 are relatively small parts in resilient engagement with surface 54 and edge 73.

The clip 82 likewise has a central loop (not shown) through which is engaged the rivet 75 holding the spring finger along the top edge 72. However, the clip 82 is secured on the upper surface 54 and the arms 92 extending outwardly on opposite sides of the rivet 75 terminate in loops 94 which are resiliently engaged against surface 54 spaced inwardly from the adjacent edge 72 of the plate. The clip 82 is aligned opposite the clip 81.

Spaced from opposite sides of clip 82 are the clips 83 secured by rivets 96, the clips 83 being inwardly spaced a short distance from top edge 72. The clips 84 along the bottom edge 73 are provided by means of wire members 98 formed with looped ends 99 by means of which said members 98 are secured to bottom surface 52 by rivets 100 (FIG. 3). The wire members 98 are extended around bottom edge 73 so that clips 84 are provided by the opposite ends of the wire members 98 engaged upon surface 54. Clips 84 likewise are arranged normal to bottom edge 73 and are similar in size to ends 90 of clip 81. Each clip 84 is spaced to one side of a clip 90 a substantially similar distance, as seen in FIG. 2.

To install the pallet 45, the bolt 64 is loosened conveniently by turning the slotted end 101 thereof seen in FIG. 2 so that the metal strip 58 can be rotated sufficiently to engage the pintle 70 thereof in a bearing formation 40 of the hinge. Then the second pintle can be engaged in the second formation 40, the strip 58 returned to its normal position and the bolt tightened, as seen in FIG. 2. Properly mounted, the bottom surface 52 faces toward the door 26 and top edge 72 of the pallet faces in the same direction as the upper end 80 of the camera. Once installed, the pallet is hingedly mounted on the camera at one end on the same hinge 28 as the door 26. As seen in FIG. 2, the pallet 45 can be swung outwardly away from door 26 so that access to latch 30 is given to open and close the door freely.

To releasably lock the pallet on the camera against pivotal movement, the pallet is swung inwardly toward the camera and pressed against the top and bottom ends of the camera. The spring fingers 74 are spaced apart a predetermined distance such that initially they are spread apart slightly as they engage the upper and lower ends of the camera. When locked in place, the bottom surface 52 may engage upon latch 30 and/or projections 77 may be caught behind ridges or shoulders 78 on the camera, if provided or else, the pallet may be engaged upon the rear end of the camera substantially flat and held against pivotal movement outwardly by resilient engagement of the spring fingers 74 against the top and bottom ends of the camera.

Referring to FIG. 1, a pair of prints 48 can be held in place on the pallet 45 in side by side arrangement. The serrated edges 102 of each print is engaged in the bight of a clip 84 and end 90 along the bottom edge of the pallet. At the opposite end of the pallet, the print is engaged by a clip 83 and clip end 94. Thus, each print 48 is securely held on the pallet in a flat condition engaged by resilient holding means approximately at the four corners thereof. In securing the print 48 on the pallet, it is convenient to hold same by the tapered flap end 104 thereof and slip the opposite serrated edge 102 into engagement with holding clips 84 and 90. Then, the print can be inserted beneath holding clips 83 and 94. Note that the holding clips are relatively small parts which will not mar or stain the upper surface of the print to any appreciable extent, and as seen in FIG. 1, the prints 48 are held flat on surface 54 of the pallet.

The camera can be used freely with the prints 48 mounted flat on the pallet 45 because they are supported in the bights of the clips 84 and clip ends 90 which pass around bottom edge 73 from the bottom surface 52 of the pallet. Thus, the photographer can take one picture, swing the pallet outwardly to the position seen in FIG. 2, open door 28 to remove the exposed portion of the film, snap the pallet into locked position on the camera seen in FIG. 1, separate the two sheets of the exposed portion of the film and mount the print portion on the pallet and apply the plastic coating composition while the print is held flat on the firm, flat surface of plate 46 and take another picture while the print is drying. The procedure can be repeated to mount a second print 48 on the pallet, as seen in FIG. 1 and another picture taken during the drying interval for the print or prints on the pallet. During drying, the print is prevented in substantial measure from unduly curling by reason of the holding clip means engaging same approximately at the four corners thereof.

Further to be noted is the manner in which the curled end formation 50 serves as a hand grip for the camera during its use. The length of the plate 46 from end 56 to a point tangential to the curled formation 50 is longer than the distance between hinge 28 and the side 106 of the camera. Thus, in the locked position of the pallet 45 seen in FIG. 1, the curled end formation 50 extends inwardly past the rear end of the camera and engages along the side 106 of the camera. Thus, the photographer can hold the camera with one hand around formation 50 and the other hand around the opposite side 108 of the camera without touching prints 48 on the pallet 45.

Because the pintles 70 are angled downwardly relative to the plate 46, the pallet can rest upon the hinge 30 in its locked position on the camera because the plate 46 will be slightly spaced from the door 26.

The curled end formation 50 also may serve another function as illustrated in FIGS. 2 and 5. The opposite ends of the formation 50 are open so that a plastic coating applicator for finishing the prints 48 may be held in the formation 50. The reference character 110 designates generally plastic coating applicator cartridge which is suitable for being housed in formation 50. The cartridge 110 includes a substantially cylindrical case 112 which can fit snugly into the formation 50 through an open end thereof. The case 112 is open at one end 114 thereof and closed at its opposite end 115. Retained in the case 112 is an absorbent applicator roll or brush 116 which may be secured at one end thereof to a cap 118. The cap 118 may be of circular formation provided with an annular groove (not shown) on the inner circumferential surface 120 thereof adapted to frictionally engage around the marginal edge 122 of open end 114. To remove the applicator roll 116, the cap 118 is pulled outwardly to disengage it from the end 122 and withdraw the roll 116 from the formation 50 to coat a print. Thereafter, the roll can be replaced in the curled formation 50. Thus, the formation 50 also can serve as a housing for a plastic coating applicator for prints from the self-processing camera 20.

Referring to FIG. 7, a modified form for a spring finger is designed generally by the reference character 125. The finger 125 is formed as an integral metal stamping. The finger 125 has a flat base portion by means of which the finger can be secured on upper surface 54 of a plate 46 by the rivets 128. Secured to the one end of the base are oppositely extending wing portions each having a longitudinally extending groove 130 in the bottom surface thereof. Extending outwardly and downwardly around the top edge 72 the plate is a resilient flange 132 having a transverse bend 134 therein spaced from the free extremity of the flange. The surface of the flange opposite the inner surface of the band 134 provides for a projection 136 which faces inwardly toward the opposite bottom edge of the plate not seen in FIG. 7. Engaged beneath each wing in the groove 130 thereof is a wire clip member having spring arms 138 and 140 protruding outwardly from the end faces of said wings respectively. Said arms 138 and 140 are substantially perpendicular one to the other and serve generally the same function as arms 92 of clip 82. The same type of spring finger 125 can be deployed along the bottom edge 73 and secured to the bottom surface 52 of the plate. The spring arms, such as 138 and 140 can be bent around the bottom edge 73 onto upper surface 54 to provide clips for holding the bottom edge of a print in the manner of clips 90. The flanges 132 serve the same function as spring fingers 74.

Variations in the structure of component parts of the pallet 45 as described and illustrated are feasible without departing from the functions ascribed thereto. For instance, materials used may vary from wire to metal strip for the several holding or clip means. Also, mechanical fastening means other than rivets or bolts can be utilized to secure parts on the plate 46. It is contemplated that the pintles 70 may be provided in a manner other than integral with metal strips 58 and 60, for instance, by welding pintles to the plate 46 without varying the general functions therefor. Likewise, the general dimensions of the plate 46 may vary depending upon different models of cameras.

The invention has been particularly defined in the claims hereto appended in language intended to be broadly construed commensurate with the improvement in the reference art contributed thereby.

What it is desired to secure by Letters Patent of the United States is:

1. A pallet for attachment on a self-processing camera having an access door giving access to a film holding chamber hingedly mounted thereon; said pallet comprising a plate member having a top edge, a bottom edge and opposite ends. first means along one of said ends for pivotally mounting the plate on the hinge mounting means of said access door, said plate being pivotal in said mounted condition between a first position displaced from the door to permit opening thereof and a second position substantially overlying the door, second means along a least one of said edges for releasably locking said plate in said second position, and cooperating clip means spaced apart along both of said edges for holding at least one photographic print from said camera substantially flat on the upper surface of the plate.

2. A pallet as described in claim 1 in which the opposite end of the plate has a hand grip formation for holding the camera during use thereof.

3. A pallet as described in claim 1 in which the opposite end of the plate has a curled formation for holding the camera during use thereof.

4. A pallet as described in claim 1 in which said second means comprises at least one resilient finger along one of said edges adapted to frictionally engage an end surface of the camera in said second position.

5. A pallet as described in claim 1 in which said first means comprises a pair of pintles adapted to be journalled at opposite extremities of said hinge mounting means.

6. A pallet as described in claim 1 in which said clip means are disposed on the upper surface of the plate for holding a print approximately at the four corners thereof.

7. A pallet as described in claim 6 in which the clip means along the bottom edge of the plate are engaged around said bottom edge and face toward the top edge of the plate for supporting a print in a vertical position.

8. A photographic print-holding pallet for use with a self-processing camera having an access door hinged to the rear surface thereof, said pallet comprising a rigid sheet member having hinge means adapted for common securement to the hinged connection of said access door whereby in use the pallet can be pivoted independently of the access door between positions overlying said door and displaced from said door, said pallet having means along an edge thereof for frictionally engaging the pallet with the rear of said camera, and having means on the said edge for clipping a photographic print to the surface of said pallet.

9. A structure as claimed in claim 8 in which common fastening means are provided for said engaging and clipping means.

10. A photographic print-holding pallet for use with a self-processing camera, comprising a rigid plate member having means for temporarily clipping a print to its surface, means at one end of said plate member for hingedly mounting same to a camera for pivotal movement independent of the rear door of the camera and means at the opposite end for storing a print-finishing chemical holder for ready use.

References Cited in the file of this patent

UNITED STATES PATENTS

| | | |
|---|---|---|
| 2,908,025 | Ashby | Oct. 13, 1959 |
| 2,969,766 | Distel | Jan. 31, 1961 |